United States Patent Office 3,034,882
Patented May 15, 1962

3,034,882
METHOD OF MAKING A HUMUS CARRIER FOR PLANT NUTRIENTS
Charles S. Renwick, Jr., 337 10th St., Richmond, Calif.
No Drawing. Filed July 6, 1959, Ser. No. 824,945
3 Claims. (Cl. 71—23)

My invention relates to organic carriers for plant nutrients, and more particularly to a method of treating wood chips with organic fertilizers of nitrogen, phosphorus, potassium or other desired plant nutrients or chemicals to render them useful as a fertilizer storage medium.

One of the objects of my invention is to provide a fertilizer impregnated wood chip which when mixed with the soil conditions the soil by increasing its friability and liberates the fertilizer over an extended interval.

Another object of the invention is to provide fertilizer impregnated wood chips with a coating which will slowly weather away and retard the liberation of the fertilizers encased therein so as to provide a more uniform distribution of the fertilizers into the soil.

Another object of my invention is to provide a method whereby commercially manufactured compounds of nitrogen, phosphorus and potash may be added to and combined with the naturally occurring complete compounds of nitrogen, hydrogen, oxygen and carbon and other chemical and mineral compounds contained within the wood chips.

A still further object of my invention is to provide in one easily manageable carrier unit, fertilizer compounds and humus directed to the improvement of three important fertility characteristics of soil, namely, its physical, biological and chemical attributes.

The invention possesses other objects and features of value some of which with the foregoing will be brought out in the following description of the invention. I do not limit myself to the showing made by the said description, since I may adopt variant forms of the invention within the scope of the appended claims.

As a result of increasing population trends, the productive land area of the country is rapidly being diminished by the redevelopment of rural farm areas to provide additional housing. This has created the necessity of reclaiming previously untillable land and of rejuvenating and reconditioning the soil of other land which has had its nutritive components depleted. To effect this rejuvenation and reconditioning of exhausted soil, many different types of high potency chemical fertilizers have been developed. Some of these fertilizing chemicals are produced in concentrated liquid form, others as dry pellets and powders. Whatever the type or form these conventional commercial fertilizers have taken, it has been a continuing problem not heretofore solved, to provide a fertilizer or fertilizing medium which would condition the soil, that is, render it more friable, and which would also return to the soil in controlled amounts over a controlled interval the nutritive elements required for soil fertility.

Present day commercial fertilizers, either liquid, pellets or powder, are usually applied in controlled amounts, and heavy fertilization takes place almost immediately and is useful for only a short interval, usually only a few days. Over fertilization is easily effected, resulting in burning of the vegetation or crops by high concentrations of soluble salts either upon the foliage or in the soil unless heavy dilution by watering is administered. Such dilution, leaches the fertilizer, causing uncontrolled liberation of the fertilizing components within a comparatively short time. Additionally, most conventional fertilizers do not add soil conditioning humus, which aids in retention of water and renders the soil more friable.

It is to obviate this problem by providing a fertilizing medium which will at once condition the soil with which it is mixed, and liberate nutritive components into the soil in controlled amounts over an extended interval, that has led to my invention, which, broadly considered, comprises the methods of impregnating and coating wood chips with chemical fertilizers, and the product resulting therefrom, which is adapted to be mixed directly into the soil to concurrently fertilize and condition the soil over an extended interval. The interval during which liberation of the fertilizing chemicals is effected is controlled by encasing each fertilizer impregnated wood chip in a soluble coating which subsequently slowly breaks down due to weathering, watering and the passage of time.

In terms of greater detail, I have found through extensive experiments with a variety of wood species that there apparently is no limitation to a particular species of wood useable, although from among local varieties such as redwood, fir, pine and cedar, I have found some more adaptable than others. Since my experiments have indicated that very satisfactory results may be secured through the use of redwood chips, I shall limit this description by reference only to this species, although it should be understood that by slight variations in the process, all within the scope of the claims, different wood species may be used.

The wood chips can be manufactured from logs, lumber, slabs, edgings, bolts and waste wood, and should be free from bark, dirt and foreign matter. The chips are preferably cut to a chip length of approximately ¾" and a thickness of ¼". Fine chips measuring less than ¼" are screened from the larger product and discarded. Screening also serves the useful purpose of eliminating dirt, bark dust, and foreign matter that may not have been eliminated in the peeling or debarking of the logs, or when picking or selecting the wood stock from waste conveyors or saw mills.

The chips are preferably produced by cutting across the longitudinal grain of the wood being chipped. This is important because most of the wood elements, such as fibers, tracheids and vessels are many times longer than they are wide, and are arranged with their long axis running lengthwise or along the "grain" in the wood. Producing the chips by making a cut across the grain thus preserves for use the natural vascular, air and cellular passages in the wood. In contrast to a cross-cut as described, a cut longitudinally of the "grain" would expose a greater percentage of the wood or xylem rays or groups of cells extending radially or at right angles to the long axis of fibers, tracheids and vessels, and chips produced by this type of cut are much less efficient in their capacity to absorb and retain extraneous materials.

When the chips hav been manufactured from the "green" lumber or wood waste they will usually be found to contain from 50 to 55% by weight of moisture, although in some species this percentage may run as high as 200%. The moisture is of two types, called "free water" when referring to moisture filling the cell cavities, and "absorbed water" when referring to moisture which is absorbed into the cell walls. In some instances it may be desirable to drive off only the free water, and to leave the cell walls saturated, however, I have found that better results are obtained by driving off both moisture components. These components are driven off by means of agitating and heating the chips in an appropriate mechanical roaster or rotary type oven or drier, with the result that the cells, cavities of longitudinal parenchyma, wood ray parenchyma and tracheids are emptied of their "free" and "absorbed" moisture content, leaving only materials such as dead protoplasm, proteins, starch, tannins, phlobaphenes, fats, cycloses and carbohydrates within the cell walls.

When the wood chips have been thoroughly dried by the extraction of all moisture, and while they are still hot from the drying treatment, they are ready for processing to impregnate the chips with the desired chemical fertilizers. It is important, but not absolutely essential, that impregnation of the chips be effected while still hot from the drying process because there is a tendency for air to replace the moisture extracted from the chips. Maintaining a high temperature in the chips, in the order of approximately 100° C., expands the air in the cell cavities, thus causing evacuation of the cell to an appreciable degree, which increases the capacity of the chip to absorb the chemical fertilizers.

For purposes of simplicity and clarity in the description of proportions and reactions, the processing of one unit of chemically processed redwood chips will be described. A unit of wood chips is equivalent to approximately one cord of wood, or when chipped about 200 cu. ft., and in the "green" state prior to drying, each unit weighs about 3800 to 4000 pounds, the weight varying according to the time of season of cutting and type of wood chips. It will of course be apparent that while for purposes of explanation this description is limited to the processing of a single unit, for commercial production a continuous process is utilized. In this regard it has been found that the drying process can be improved by agitating and heating the wood chips within a vacuum furnace or oven which not only extracts "free" and "absorbed" moisture from the chips but also evacuates air from additional voids in the chips, thus providing additional volumetric capacity for receiving the fertilizer solution, which is preferably injected into still hot and evacuated chips under pressure varying from 40 to 200 p.s.i., thereby still further increasing the absorption capacity of the chips. Forced evacuation and impregnating under pressure, while providing a more ideal product, is of course more expensive, and I have found that for most practical purposes an air-tight motor driven rotary dried or oven of conventional use and design will serve the purpose. This equipment, while it does not evacuate the voids in the wood chips to the same degree that a vacuum oven would, does provide a certain degree of evacuation, which practically speaking, has been found sufficient to render an extremely useful product.

At this stage in the process, the moisture-free and partially evacuated wood chips still contain all of their native complex compounds, including nitrogen, hydrogen, oxygen and carbon compounds and the other chemical and mineral compounds naturally occurring by organic and inorganic infiltration in the wood from which the chips are formed. Organic infiltration has been found to be more abundant in heartwood where it impregnates cell walls and, if unusually abundant, may collect in cell cavities as well, particularly parenchyma and hollow pores or vessels. The compounds comprising the organic infiltration of wood cover a wide range and are extremely complex chemically. They include gums, resins, dyes, tannins and many others. Inorganic infiltration of wood accounts for the presence of the principal metallic components found in wood, such as calcium, potassium and magnesium. The common acid radicals found are $-CO_3$, $-PO_4$, and $-SiO_4$. Besides these, small amounts of sodium, manganese, aluminum, iron, sulphates and chlorides are almost invariably present. Also, crystals of calcium oxalate are not infrequent.

To add commercial chemical fertilizers to the hot dry chips, they are impregnated, under pressure or otherwise, by placing the chips, a unit in this case, into a rotating drum. A cold solution of liquid chemical fertilizer is added, the solution containing any desirable combination of the major and minor fertilizing elements, mainly nitrogen, phosphorus and potash. Again, it is important, but not essential, that the solution be cold. Since the chips are hot and whatever air contained within the cell cavities and voids is also hot and therefore expanded, immersing the hot chips in cold solution effects a rapid contraction of the air within the cell cavities and voids, resulting in the solution being sucked into the cell cavities and voids. It can readily be understood that the spaces within the chips made available by evacuation of all moisture from the cell cavities and cell walls, is now available for absorbing approximately 2000 pounds or a ton of liquid fertilizer. While there are exceptions and amounts will vary somewhat because of the inherent differences in the individual and types of chips, time of harvest of trees and thoroughness of drying, I have found that one unit of dry chips will absorb and retain about 175 to 200 gallons of the liquid fertilizer.

To insure that the chemical fertilizer has thoroughly penetrated and become absorbed into the wood cells or voids, the chips are rotated and agitated thoroughly and intermittently for periods up to 72 hours or longer, or until treatment to refusal has been effected, when the excess liquid fertilizer is drawn off and recovered for future use.

After the wood chips have been completely saturated with the fertilizing medium, they are ready for the chemical coating process and treatment, which temporarily seals the absorbed soil nutrients within the chips.

At this stage of the processing the chips are acidic because of the addition of phosphorus in the form of phosphoric acid, or other type of acid such as dilute nitric or hydrochloric, coupled with the natural wood tannins of the chips. Added to the unit of fertilizer impregnated wood chips is approximately 15 gallons of silicate of soda solution, the ratio of silica to soda being determined by how heavy a silica coating is desired on the chips. I have experimented with and found satisfactory various aqueous solutions of sodium silicate, ranging in proportion of sodium to silicon dioxide of from 1:2 to 1:4. The silicate of soda solution and the chemical fertilizer impregnated chips are thoroughly mixed and agitated in a rotary type mixer. The chips become thoroughly coated by such mixing and agitation, during which interval a chemical reaction occurs.

The chemical reaction takes place between the fertilizing chemicals with which the wood chips are impregnated and the silica of soda being applied. The soda combines with the lignin of the wood chip cells, forming sodium lignate, while another chemical reaction occurs between the silica of soda and the phosphoric acid, which hydrolizes, forming orthosilic acid. In this latter reaction between the acid and silica, the tannins of the redwood chips perform the function of a catalyst and assist in carrying the reaction forward. The final stage of this reaction is not completed until the treated chips are exposed to the atmosphere.

On exposure of the chips to the atmosphere, evaporation of the water or moisture takes place, causing precipitation of silica or silicon dioxide. Blooming in the form of a powdery, amorphous substance occurs, which is subsequently washed or leached away by natural weathering in the wind and the rain.

The orthosilic acid, which in the early stages of the reaction appeared as a colloidal solution, then quickly changed to a gelatinous precipitate, when dehydrated, deposits a film or coating on each wood chip of minutely fine grained silica, encasing each individual wood chip and forming a silica seal around it. Within this fine grained silica coating which seals the vascular, air and cellular passages, are imprisoned the valuable soil nutrients which are now ready for application to the soil. The fertilizer impregnated chips are preferably spread and worked into the soil to a depth of from three to six inches.

As the coating on the chips is slowly broken down by weathering, watering and time, the fertilizing chemicals entrapped within each chip are slowly and uniformally liberated into the soil over a long interval during the growing season so that over-fertilization does not occur.

From the above it will be apparent that with weathering and the passage of time, all of the nutrients will pass from the chips into the soil and that concurrently and subsequently the chips themselves constitute a fine soil conditioning medium, which renders the soil more friable, and ultimately, over a period of time, decompose and serve as an organic fertilizer and source of humus for the soil.

I claim:

1. The method of producing a humus carrier for plant nutrients comprising the steps of forming to appropriate size a chip of wood having a myriad of voids therein, removing a substantial amount of moisture from said body, treating the chip with a compound of chemical plant nutrients in solution including phosphoric acid to saturate said chip and fill the voids therein, treating the saturated chip with a silicate of soda solution to effect a reaction between said phosphoric acid and the silica of soda to produce on said chip a gelatinous orthosilic acid precipitate, and subsequently dehydrating said orthosilic precipitate to effect the deposition on said chip of a fine grained silica coating sealing said plant nutrients within the chip.

2. The method of producing a humus carrier for plant nutrients comprising the steps of forming to appropriate size a chip of wood having a myriad of voids therein, heating the chip so formed to drive therefrom moisture entrapped therein, treating the moisture-free body with a compound of chemical plant nutrients in solution including phosphoric acid, to saturate said chip and fill the voids therein, treating the saturated chip with a silicate of soda solution to form orthosilic acid and subsequently exposing the treated chip to the atmosphere to effect the deposition on said chip of a fine grained silica coating sealing said plant nutrients within the chip.

3. The combination according to claim 2, in which said heating and treating of the chip is effected within a vacuum chamber.

References Cited in the file of this patent

UNITED STATES PATENTS

| | | |
|---|---|---|
| Re. 21,638 | Treeland | Nov. 26, 1940 |
| 847,749 | Ellis | Mar. 19, 1907 |
| 1,446,113 | Blackwell | Feb. 20, 1923 |
| 2,029,988 | Doe | Feb. 4, 1936 |
| 2,091,993 | Jones | Sept. 7, 1937 |
| 2,498,480 | Bierlich | Feb. 21, 1950 |
| 2,547,730 | Arnold et al. | Apr. 3, 1951 |
| 2,806,773 | Pole | Sept. 17, 1957 |
| 2,881,066 | Sproull et al. | Apr. 7, 1959 |